United States Patent Office 3,395,071
Patented July 30, 1968

3,395,071
METHOD OF PREPARING ASBESTOS SHEETS FROM AQUEOUS SLURRIES CONTAINING SILICONE RESIN EMULSIONS
Siegfried Nitzsche, Ewald Pirson, and Erich Schmidt, Burghausen, Bavaria, Germany, assignors to Wacker-Chemie G.m.b.H., Munich, Bavaria, Germany
No Drawing. Filed Sept. 9, 1963, Ser. No. 307,294
Claims priority, application Germany, Sept. 13, 1962, W 32,951
13 Claims. (Cl. 162—155)

This invention relates to a novel method of preparing shaped articles from inorganic fibers and particularly a method of preparing sheets of inorganic fibers such as asbestos fibers.

The use of silicones on sheets of organic and/or inorganic fibers is known. Sheet materials of organic or inorganic fibers can be lacquered, impregnated or bonded with silicone resins. Furthermore, fibers, kernels, scales, powder, and particles can be folded with the use of silicone resin binders. Sheet materials and molded articles prepared by these known methods are water repellent and display excellent electrical properties.

The methods heretofore employed to prepare sheets and moldings of fibers and granules employing silicones as impregnants, binders, etc. have not been widely adopted because a relatively large amount of silicone resin is required in order to obtain the desired degree of water repellency and the desired electrical properties. Coating or lacquering the sheet materials with silicone resins in solvent solution consumes large amounts of silicones and large amounts of solvent thus making the process too costly to be commercially attractive.

In the known methods of preparing sheet materials or laminates employing silicone resins, it has often been necessary to add binders or primers. Organic binders (e.g. vinyl polymers, acrylic polymers, glues, etc.) have been most widely used. The organic binders have a deleterious effect on the finished sheets of glass cloth, asbestos, or other inorganic material when these materials are ultimately employed as electrical insulation under conditions of high temperature and/or high humidity. Furthermore, the organic binders and primers impede uniform impregnation of the finished glass or asbestos sheets when the sheets are subsequently treated with silicones.

A recent development in preparing sheets of inorganic fibers comprises employing an emulsion of resinous silicones based on siloxane polymers and finishing the inorganic fibers by immersing them in the emulsion and breaking the emulsion. It has been proposed to break the emulsion simply by adding the asbestos fibers thereto.

Thus the search for a sheet material suitable for use as electrical insulation, etc. and substantially free of organic materials has continued. The object of this invention is to introduce a commercially practical method for preparing sheets employing silicone resins as binders, impregnants and coatings for inorganic fibers and/or granules. A further object is an entirely inorganic sheet material for use as electrical insulation. A novel method of preparing laminates of glass or asbestos sheets is also an object of this invention. A further object is a method of preparing an inorganic sheet material employing silicones as binders and thereafter impregnating the sheet with additional quantities of silicone.

This invention consists of preparing shaped articles from inorganic fibers by impregnating the fiber materials with organic solvent soluble silicone resins in aqueous emulsion employing an aqueous emulsion of silicone resins containing not more than 70 percent by weight of resin, a hardening catalyst, minimal quantities of non-ionic emulsifying agents based on either polyethylene glycol with an aromatic radical substituted with alkyl groups having a total of 12 carbon atoms combined with 13 ethylene oxide units or on a polyvinyl alcohol derivative representing a 70–98% saponified vinyl acetate, said silicone resin being a methylsiloxane polymer having a methyl to silicon ratio from 0.8/1 to 1.15/1, breaking the emulsion and molding the fibers by withdrawing the water and drying.

The method of this invention embraces many critical and narrowly defined limits to achieve the desired quality of product. Thus whereas the prior art considered silicone resins in general to be useful in preparing inorganic sheet material from inorganic fibers, it has been found that the use of processing equipment and methods presently employed in the asbestos industry and optimum quality of product limit the operable silicone resins to a narrow and sharply defined range. The silicone resins operable herein are siloxane polymers soluble in organic solvents such as benzene, of the general unit formula

where R represents a monovalent aliphatic hydrocarbon or monocyclic aryl radical, at least 95 percent of the radicals represented by R being $CH_3$— radicals and $n$ has an average value from 0.8 to 1.15. Suitable resins can be prepared in accordance with U.S. Patents Nos. 2,647,880, issued Aug. 4, 1953 and 2,842,521, issued July 8, 1958. Preferred are methyl substituted siloxane polymers containing about 0.5 to 1.0% by weight residual —OH groups and/or 0.5 to 10% by weight alkoxy groups. The presence of at least two hydroxy or alkoxy substituents bonded directly to silicon atoms in each molecule provides reaction sites capable of introducing further cross-linking on curing. In addition to the methyl radicals present as substituents, minor amounts, i.e. a total of up to 5% by weight, of ethyl, propyl, butyl and other alkyl radicals, as well as phenyl and vinyl radicals can be present.

The desired ease of preparation and excellent products are only achieved with the siloxane resins having an R/Si ratio of from 0.8/1 to 1.15/1 and the best results are achieved with a methyl to silicon ratio of 1.09/1. Resins having a lower R/Si ratio than 0.8/1 are difficult to prepare and hard to use because of their brittleness. Resins having an R/Si ratio above 1.15/1 are too soft for the ordinary curing temperatures and drying times customarily employed in preparing inorganic sheet materials. It is apparent that at the lower end of the operable range of R/Si ratio, the problem of resin gelation becomes significant and at the extreme of 0.8/1 the product cannot be purified beyond a purity of about 95%.

The silicone resin as employed herein can be dissolved in solvent. Economy and fire hazards encountered when organic solvents are employed commercially are pertinent to the amount of solvent to be employed. It has been found that superior products are achieved when the silicone resin is admixed with and dissolved in about 10 to 20% by weight of an organic solvent which is immiscible with water, preferably xylene, benzene, toluene and the like.

The resin content of the emulsion is another critical factor. When the emulsion contains more than 70% by weight of silicone resin, it is too viscous. Emulsions containing less than 10% by weight of silicon resin are expensive to ship and store and are not as stable on storage as is desirable. Accordingly, the limits on silicone content of the emulsions employed herein are 10–70% by weight silicon, preferably 20–60% by weight with optimum results achieved in the range 25–50% by weight of silicone resin in the emulsions.

The emulsifying agents employed herein are non-ionic in character and assure an easy, residue-free breaking of the emulsion in the presence of the inorganic fibers.

The operable emulsifying agents include materials based on polyethylene glycol having 5–15, preferably 8–14 and optimally 13 ethylene oxide units per molecule. The hydrophobic portion of the molecule must be an aromatic radical substituted with alkyl groups. The best results are achieved with a tri-isobutyl substituted aromatic radical [e.g. (tri-isobutyl)phenyl-] and similar alkaryl radicals wherein the alkyl substituents have a total of 10–15, preferably 12 carbon atoms. This type of emulsifying agent is employed in quantity of 0.5 to 2% by weight based on the weight of silicone resin present in the emulsion.

Alternatively, the emulsifying agent can be a polyvinyl alcohol derivative. A saponified polyvinyl acetate with a degree of saponification of 70–98% and a molecular weight distribution between 2,000 and 800,000 is particularly useful. The polyvinyl alcohol derivatives are employed in amounts from 2% to 4% by weight based on the weight of silicone resin employed.

It is possible to obtain stable, water repellent fibrous materials employing silicone resins cured by heat alone but it is generally preferred to employ a condensation catalyst to accelerate the cure rate of the resin. A multitude of catalysts has been proposed for this purpose but only a small and critical segment of this catalyst group can be employed herein. Thus amines are inoperable because they reduce the water repellency of the ultimate product, salts are inoperative because they impair the electrical properties, and acids suffer a similar deficiency. It is necessary to employ catalysts which do not deleteriously influence the stability of the emulsion at low temperatures, do not attack the container and do not impair the electrical and/or the water repellent properties of the ultimate product. This invention requires the use of two types of condensation catalysts which meet the above requirements namely aluminum chelates and organo substituted tin acylates.

The aluminum chelates operable as condensation catalysts herein are illustrated by aluminum chelates of malonic ester, acetoacetic ester and acetyl acetone. The acetyl acetonate is particularly useful because of ease of preparation as well as effectiveness. These chelates are preferably dissolved in a water-insoluble organic solvent such as toluene or xylene and emulsified with one of the emulsifying agents specified above. The aluminum chelates are employed in amounts ranging from .03 to 1.0% by weight based on the silicone resin with optimum properties achieved at about 0.1% by weight of the catalyst. The aluminum chelates such as aluminum acetyl acetonate are effective condensation accelerators only at elevated temperatures exceeding about 150° C.

The second class of catalysts employed herein includes organo-tin acylates, particularly acyl derivatives of dialkyltin bases such as dibutyl tin- and dioctyl tin acylates particularly dialkyl tin dilaurate and dialkyl tin maleinate. The effectiveness of the organotin acylates as catalysts falls off as the amount of water present increases. However, if the tin compound and the silicone resin mixing occurs on the asbestos or inorganic fiber, the desired condensation and cure can be effected at room temperature. Indeed, the organo tin acylates are particularly useful as condensation catalysts for room temperature operation but are effective as well as elevated temperatures. When room temperature curing is desired, the organo tin acylates, particularly dialkyl tin compounds, are best added in aqueous emulsion or dispersion dissolved in water-insoluble organic solvents. Because of the easy solubility of dialkyl tin diacylates in organic solvents, the proportion of solvent can be held very low. When the tin compound is a liquid, the use of organic solvent is avoided. The organo tin acylates are employed in proportions of from 0.1 to 3.0% by weight based on the silicone resin present.

The method of this invention is applicable to inorganic fibers such as glass, asbestos, slag, rock wool (e.g. basalt wool) and to combinations of material such as asbestos fibers and mica flour or flakes, glass fibers or frit and other granules, flakes and powders or inorganic materials. The method can be employed to produce papers, boards, plates and other formed bodies. The fiber material is employed in the dry state or in aqueous slurry.

The following examples are included herein to assist those skilled in the art in understanding and practicing this invention. All parts and percentages are based on weight unless otherwise stated. The scope of the invention is delineated in the claims and is not limited by the examples.

Example 1

A methylsilicone resin prepared according to the process of U.S. Patent No. 2,647,880 was prepared but the starting materials of methyltrichlorosilane and dimethyldichlorosilane were selected in such quantities that the finished siloxane had a resulting $CH_3/Si$ ratio of 1.09/1.0. This required a quantity ratio of methyltrichlorosilane to dimethyldichlorosilane of 92/8. The ethoxyl content of the silicone resin thus prepared was 4%, the hydroxyl group content 0.6%. In preparing an emulsion as described in the following, the resin was used in the form of an 85% solution in toluene. 0.1 kg. of a non-ionic emulsifying agent based on polyethylene glycol with the following molecular structure was added to 12 kg. of this solution.

The emulsifying agent, commercially available, was a phenol substituted by 3 isobutyl groups carries a chain of 12 ethylene oxide units; this (tri-isobutyl)phenyldodecaethylene oxide glycol (hydroxydodecaethoxy-triisobutylphenolate) is a known surface active agent. The mixture of resin and emulsifying agent was vigorously stirred with an emulsifier apparatus, for instance a commercial emulsion mixer and 8 kg. of water were slowly added. A stable resin emulsion with a resin content of 50% was obtained. As curing catalyst for the resin, 0.1 kg. of a 25% aqueous emulsion dibutyltin dilaurate was added to the emulsion shortly before using.

To prepare silicone-resin bonded asbestos board a uniform slurry of 100 kg. asbestos fibers and 700 l. water was readied in a mixer and the above described resin emulsion was added. To accelerate the breaking of the emulsion, about 500 g. acetic acid may also be added. After a short time the emulsion broke and the dispersed resin precipitated on the slurried fibers completely.

Finally the material was worked in the ordinary manner on the pulp machine. The asbestos boards were dehydrated by pressing in the ordinary manner and dried in a dry chest for 6 hours at 120° C.

Example 2

A silicone resin was prepared according to the process of U.S. Patent No. 2,647,880 in which the raw materials methyltrichlorosilane and dimethyldichlorosilane were taken in a weight ratio of 94/6. The resulting silicone resin solution was set at a solids content of 80%. 2.5 kg. of this resin solution was then mixed with 40 g. of an emulsifier based on polyvinyl alcohol. The emulsifying agent was prepared by partial hydrolysis of high molecular polyvinyl acetate up to a degree of hydrolysis of 90°. The emulsifying agent used consisted of a mixture of molecules with a degree of polymerization of 500 to 2,000.

The silicone resin was emulsified with emulsion mixer while 1.5 kg. water were added during continuous stirring. The finished emulsion had a resin content of 50%.

To finish the solid carton-like material, 80 g. of a condensation accelerator composed of a 10% solution of aluminum acetyl acetonate emulsified in three times that quantity of water were added to 4 kg. of the resin emulsion.

The resin emulsion thus catalyzed was mixed unthinned with 3 kg. asbestos fibers and 1 kg. mica flour. This broke the emulsion and the silicone resin settled on the inorganic material. Most of the water was removed mechanically and the mass was dried and granulated in a thin film at 90° C. The granulate was pressed into sheets at a temperature of 150° C. in suitable molds. The pressed articles were useful as heat and waterproof electrical insulating materials.

Example 3

To 60 kg. of a 75% methylsilicone resin solution prepared according to the process of U.S. Patent No. 2,842,521, with a methyltrichlorosilane/dimethyldichlorosilane ratio of 95/5 were added to 0.3 kg. of an emulsifying agent based on polyethylene glycol. The molecular structure of the emulsifying agent shows a phenol substituted by 2 hexyl groups having a chain with 8 ethylene oxide units. An aqueous emulsion with 25% silicone resin content was prepared in the manner described.

A mixture of 300 kg. asbestos fiber and 100 kg. glass fibers were placed in a mixer with 4,000 l. of water 180 kg. of the resin emulsion was added slowly while stirring. After a short time the emulsion broke whereupon the resin precipitated on the fibers. Papers were finished on the paper machine in the ordinary manner from this mass which upon drying at 150° C. could be used as electrical insulating material.

Example 4

A methylsilicone resin was prepared according to the process of Example 1 using only methyltrichlorosilane as starting material which still contained up to 5% silicon tetrachloride and 1 to 2% dimethyl dichlorosilane. The silicone resin prepared in this manner had an CH$_3$/Si ratio of .90/1.0. The concentration of the resin solution obtained was set at 80%.

An emulsion was prepared from this resin solution according to the process described in Example 2 with the help of an emulsifying agent based on polyvinyl alcohol with a resin content of 60%. The emulsifying agent was prepared by partial hydrolysis of polyvinylacetate up to a degree of hydrolysis of 80%.

As catalyst to accelerate the curing of the resin in the finished material 10% of the aluminum chelate emulsion of acetoacetic ester was added to the resin emulsion shortly before processing. The catalyst emulsion was prepared by emulsifying a 10% solution of the chelate in benzene in the same quantity of water.

The resin emulsion thus prepared was used for manufacturing asbestos board as in Example 1.

That which is claimed is:
1. The method of preparing shaped materials from inorganic materials selected from the group consisting of fibers, granules, flakes and powders of asbestos, mica, glass and mixtures thereof consisting essentially of
  (1) preparing an aqueous emulsion consisting essentially of
    (a) 10 to 70 parts by weight silicone resin in 100 parts by weight emulsion, said silicone resin being a siloxane polymer which is soluble in benzene and is of the general unit formula

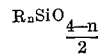

where each R is a monovalent radical selected from the group consisting of aliphatic and monocyclic aryl hydrocarbon radicals, at least 95% of the substituents represented by R being methyl radicals and $n$ has an average value from 0.8 to 1.15, dissolved in
    (b) up to 20% by weight based on the weight of silicone resin of an organic solvent which is immiscible with water, and
    (c) a non-ionic emulsifying agent selected from the group consisting of (1) 0.5 to 2.0% based on the weight of silicone resin present of a polyethylene glycol derivative containing 5 to 15 inclusive, ethylene oxide units and a hydrophobic portion which is an aromatic radical substituted by alkyl groups, the alkyl substituents containing 10 to 15 carbon atoms, and (2) 2 to 4% by weight based on the weight of silicone resin present of a polyvinyl alcohol derivative, and
    (d) a condensation catalyst selected from the group consisting of (1) .03 to 1% by weight based on the weight of silicone resin present of an aluminum chelate selected from the group consisting of aluminum chelates of malonic ester, acetoacetic ester and acetyl acetone and (2) 0.1 to 3% by weight based on the weight of silicone resin present of a dialkyl tin diacylate, and
    (e) water,
  (2) adding the inorganic fiber material to the emulsion and breaking the emulsion,
  (3) molding and shaping the material while withdrawing the water, and
  (4) drying the mass and curing the resin.

2. The method of claim 1 further characterized in that the siloxane polymers employed contain residual reactive groups selected from the group consisting of 0.5 to 1% by weight hydroxyl radicals and at least 0.5% by weight alkoxy radicals.

3. The method of claim 1 further characterized in that the emulsion employed contains 20–60% silicone resin.

4. The method of claim 1 further characterized in that the inorganic fiber is asbestos.

5. The method of claim 4 further characterized in that the fiber is added as an aqueous slurry.

6. The method of preparing sheets of asbestos fiber-silicone resin articles consisting essentially of adding an aqueous slurry of asbestos fibers to an aqueous emulsion containing 20 to 60% by weight silicone resin prepared by emulsifying 100 parts by weight of an organosiloxane polymer which is soluble in benzene wherein the organic substituents are methyl radicals, the methyl to silicon ratio is in the range 0.8/1 to 1.15/1, said polymer containing an average of at least two reactive groups per molecule selected from the group consisting of 0.5 to 1.0% by weight hydroxyl groups and 0.5 to 10% by weight alkoxy groups, dissolved in 10 to 20 parts by weight of an organic solvent, a non-ionic emulsifying agent selected from the group consisting of (1) 0.5 to 2.0 parts by weight of an alkaryl derivative of a polyethylene glycol containing 8 to 14 inclusive ethylene oxide units and having a hydrophobic portion consisting of an aromatic radical substituted with at least one alkyl groups, the alkyl substituents containing a total of at least 10 and not more than 15 carbon atoms and (2) 2 to 4 parts by weight of a saponified polyvinyl acetate with a degree of saponification of 70 to 98% and a molecular weight distribution between 2,000 and 800,000, and a curing catalyst selected from the group consisting of (1) .03 to 1 part by weight of an aluminum chelate selected from the group consisting of aluminum chelates of malonic ester, acetoacetic ester and acetyl acetonate and (2) 0.1 to 3 parts by weight of a dialkyl tin diacylate and water, breaking the emulsion, molding the sheet by withdrawing the water, drying the sheet and curing the silicone resin.

7. The method of claim 6 wherein the emulsion is broken by adding the asbestos fibers.

8. The method of claim 6 wherein the curing catalyst is dibutyl tin dilaurate.

9. The method of claim 6 wherein the emulsifying agent is hydroxydodecaethoxy-triisobutyl-phenolate.

10. The method of claim 6 wherein the emulsifying agent is a partial hydrolyzate of polyvinyl acetate having a degree of polymerization in the range of 500 to 2,000.

11. The method of claim 6 wherein the curing catalyst is aluminum acetyl acetonate.

12. The method of claim 6 wherein the curing catalyst is an aluminum chelate of acetoacetic ester.

13. The method of claim 6 wherein the siloxane polymer is a methyl polymer exhibiting a methyl to silicon ratio of 1.09/1 and having a hydroxyl content of from 0.5 to 1.0%.

References Cited

UNITED STATES PATENTS

| | | | |
|---|---|---|---|
| 2,559,791 | 7/1951 | Peyrot et al. | 260—37 |
| 2,985,544 | 5/1961 | De Monterey et al. | 260—29.2 |
| 3,076,773 | 2/1963 | Foster et al. | 260—29.2 |
| 2,633,433 | 3/1953 | Hollenberg | 162—155 |
| 3,215,662 | 11/1965 | Clark | 260—37 |
| 3,240,663 | 3/1966 | Raczek | 260—46.5 |

FOREIGN PATENTS 746,038    3/1956    Canada.

OTHER REFERENCES

S. Fordham, "Silicones," George Newnes Ltd., London (1960), pp. 196, 198, 222, and 223.

C. J. Bergendahl and C. E. Libby, "Beater Sizing with Silicones," Paper Trade Journal, vol. 125, No. 10, September 1947, pp. 40–48.

H. Berger, "Asbestos with Plastics and Rubber," English translation by Ralph E. Oesper, Chemical Publishing Company, Inc. N.Y. 1966, pp. 87–96 relied upon.

MORRIS LIEBMAN, *Primary Examiner.*

J. E. CALLAGHAN, *Assistant Examiner.*